(12) United States Patent
Yamada

(10) Patent No.: US 12,456,838 B2
(45) Date of Patent: Oct. 28, 2025

(54) CONNECTOR WITH BRACKET HOLDING WIRES DRAWN OUT FROM CONNECTOR HOUSING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yusuke Yamada, Mie (JP)

(73) Assignees: AUTONETWORKS TECHNOLOGIES, LTD., Mie (JP); SUMITO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 340 days.

(21) Appl. No.: 18/024,015

(22) PCT Filed: Aug. 2, 2021

(86) PCT No.: PCT/JP2021/028539
§ 371 (c)(1),
(2) Date: Feb. 28, 2023

(87) PCT Pub. No.: WO2022/054460
PCT Pub. Date: Mar. 17, 2022

(65) Prior Publication Data
US 2023/0268685 A1    Aug. 24, 2023

(30) Foreign Application Priority Data
Sep. 11, 2020   (JP) ................................. 2020-152999

(51) Int. Cl.
*H01R 13/512*   (2006.01)
*H01R 13/595*   (2006.01)
(Continued)

(52) U.S. Cl.
CPC ......... *H01R 13/512* (2013.01); *H01R 13/595* (2013.01); *H01R 13/6581* (2013.01); *H01R 13/6592* (2013.01)

(58) Field of Classification Search
CPC .......................... H01R 13/512; H01R 13/595; H01R 13/6581; H01R 13/6592
(Continued)

(56) References Cited

U.S. PATENT DOCUMENTS 3,349,364 A * 10/1967 Stauffer ............... H01R 13/595
439/589
3,638,169 A *  1/1972 Caveney ............ H01R 13/5804
439/471
(Continued)

FOREIGN PATENT DOCUMENTS

JP   H10284172 A  * 10/1998
JP   H11-224719 A    8/1999
(Continued)

OTHER PUBLICATIONS

International Search Report issued on Oct. 19, 2021 for WO 2022/054460 A1 (6 pages).

*Primary Examiner* — Peter G Leigh
(74) *Attorney, Agent, or Firm* — Venjuris, P.C.

(57) ABSTRACT

A connector 10 is provided with a connector housing 15 including a wire draw-out opening 20, a terminal 14 accommodated in the connector housing 15, a wire 12 connected to the terminal 14 and pulled out to outside of the connector housing 15 through the wire draw-out opening 20, and a bracket 22 made of metal for holding the wire 12 pulled out through the wire draw-out opening 20. The bracket 22 includes a first holding portion 24 and a second holding portion 26 to be fixed to each other while sandwiching and holding the wire 12 from both sides in a direction perpen- (Continued)

dicular to an axis of the wire 12, and a fixing portion 139 to the connector housing 15.

11 Claims, 9 Drawing Sheets

(51) Int. Cl.
    *H01R 13/6581* (2011.01)
    *H01R 13/6592* (2011.01)

(58) Field of Classification Search
    USPC ................................. 439/345, 578
    See application file for complete search history.

(56) References Cited

U.S. PATENT DOCUMENTS

| | | | | |
|---|---|---|---|---|
| 5,178,559 A * | 1/1993 | Mello | ................ | H01R 13/512 |
| | | | | 439/472 |
| 5,831,815 A * | 11/1998 | Miller | ..................... | H01R 4/20 |
| | | | | 361/437 |
| 7,485,806 B1 * | 2/2009 | Gretz | .................... | H02G 3/0666 |
| | | | | 174/553 |
| 8,328,572 B2 * | 12/2012 | Tashiro | ................ | H01R 13/506 |
| | | | | 439/271 |
| 9,106,068 B2 * | 8/2015 | Barna | ....................... | H02G 3/32 |
| 2009/0197450 A1 * | 8/2009 | Ooki | .................. | H01R 13/5208 |
| | | | | 439/271 |
| 2011/0207354 A1 | 8/2011 | Tashiro | | |
| 2013/0333944 A1 * | 12/2013 | Sakakura | ........... | H01R 13/5804 |
| | | | | 174/74 R |
| 2015/0144395 A1 * | 5/2015 | Tanaka | ..................... | H02G 3/22 |
| | | | | 174/668 |
| 2015/0144396 A1 * | 5/2015 | Tanaka | ................ | H02G 15/007 |
| | | | | 174/668 |

FOREIGN PATENT DOCUMENTS

| | | | | |
|---|---|---|---|---|
| JP | 2007103044 A | * | 4/2007 | |
| JP | 2009-099300 A | | 5/2009 | |
| JP | 2011009108 A | * | 1/2011 | |
| JP | 2011175775 A | * | 9/2011 | |
| JP | 2013110025 A | * | 6/2013 | |
| JP | 2015011947 A | * | 1/2015 | |
| JP | 2015103460 A | * | 6/2015 | ......... H01R 13/4367 |

* cited by examiner

CONNECTOR WITH BRACKET HOLDING WIRES DRAWN OUT FROM CONNECTOR HOUSING

CROSS REFERENCE TO RELATED APPLICATIONS

This application is a national phase of PCT application No. PCT/JP2021/028539, filed on 2 Aug. 2021, which claims priority from Japanese patent application No. 2020-152999, filed on 11 Sep. 2020, all of which are incorporated herein by reference.

TECHNICAL FIELD

The present disclosure relates to a connector.

BACKGROUND

Conventionally, a connector has been used to electrically connect in-vehicle devices. Such a connector includes a connector housing, a terminal accommodated in the connector housing and a wire connected to the terminal, and the wire is pulled out to outside through a wire draw-out opening of the connector housing. If an external force applied to the wire pulled out to the outside is transmitted to a connected part of the wire and the terminal, problems such as a connection failure occur. Accordingly, a rear holder made of resin for holding a wire in a connector housing while suppressing the swing of the wire is provided, for example, in patent document 1, to suppress the transmission of the external force applied to the wire to the connected part to the terminal.

PRIOR ART DOCUMENT

Patent Document

Patent Document 1: JP 2011-054393 A

SUMMARY OF THE INVENTION

Problem to be Solved

However, since the rear holder is made of resin, there have been cases where the rear holder is deformed by creep and a clearance is formed between the rear holder and the wire under a high-temperature environment. In this way, it might not be possible to suppress the swing of the wire with respect to the connector housing.

Accordingly, a connector of a novel structure is disclosed which can suppress or hinder the transmission of an external force applied to a wire to a connected part of the wire and a terminal also under a high-temperature environment by suppressing or hindering the swing of the wire with respect to a connector housing.

Means to Solve the Problem

The present disclosure is directed to a connector with a connector housing including a wire draw-out opening, a terminal accommodated in the connector housing, a wire connected to the terminal, the wire being pulled out to outside of the connector housing through the wire draw-out opening, and a bracket made of metal, the bracket holding the wire pulled out through the wire draw-out opening, the bracket including a first holding portion and a second holding portion to be fixed to each other while sandwiching and holding the wire from both sides in a direction perpendicular to an axis of the wire and a fixing portion to the connector housing.

Effect of the Invention

According to the connector of the present disclosure, it is possible to suppress or hinder the transmission of an external force applied to a wire to a connected part of the wire and a terminal also under a high-temperature environment by suppressing or hindering the swing of the wire with respect to a connector housing.

DETAILED DESCRIPTION TO EXECUTE THE INVENTION

Description of Embodiments of Present Disclosure

Figure 1:
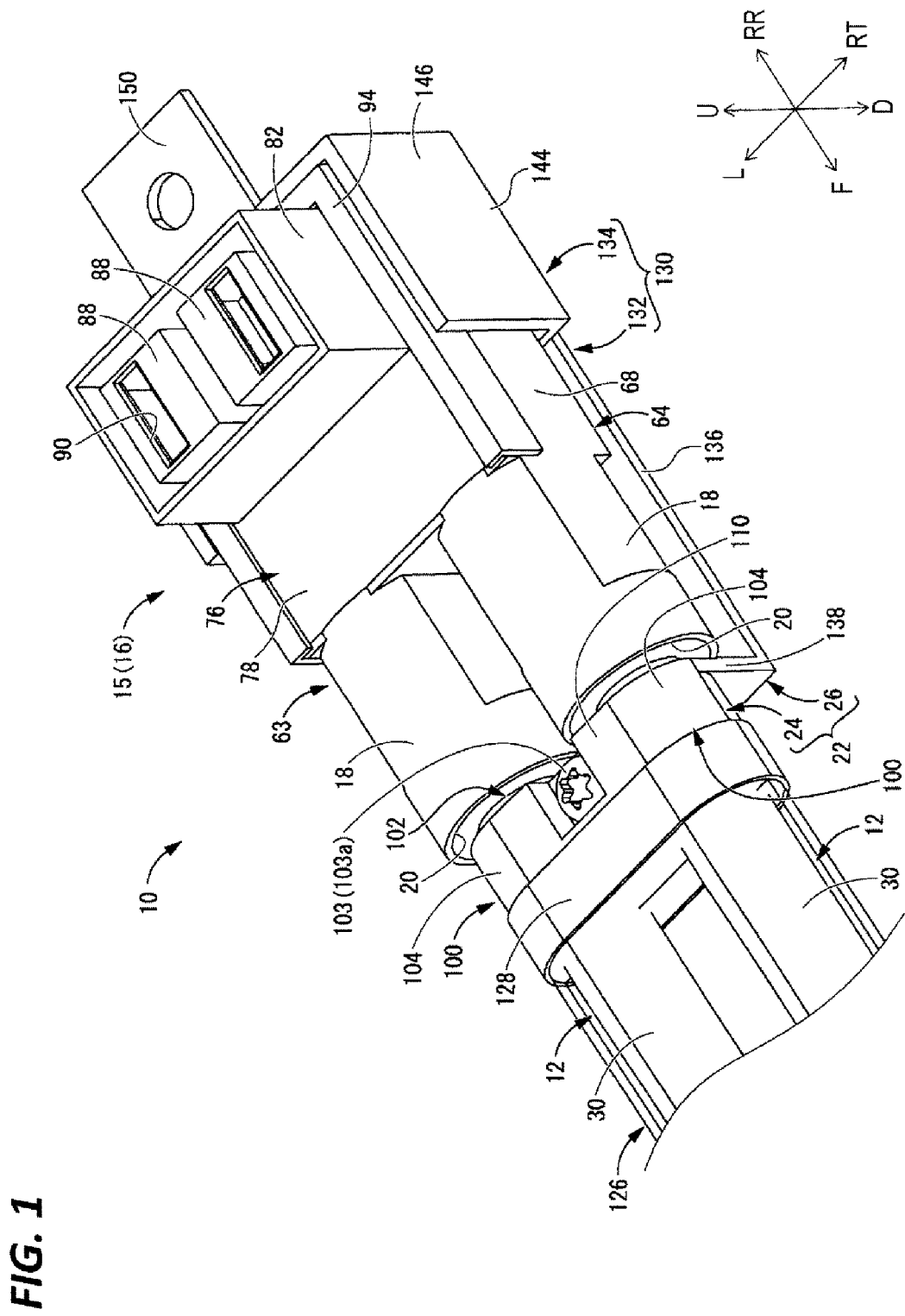
FIG. 1 is a perspective view showing a connector according to one embodiment when viewed from above.
Figure 2:
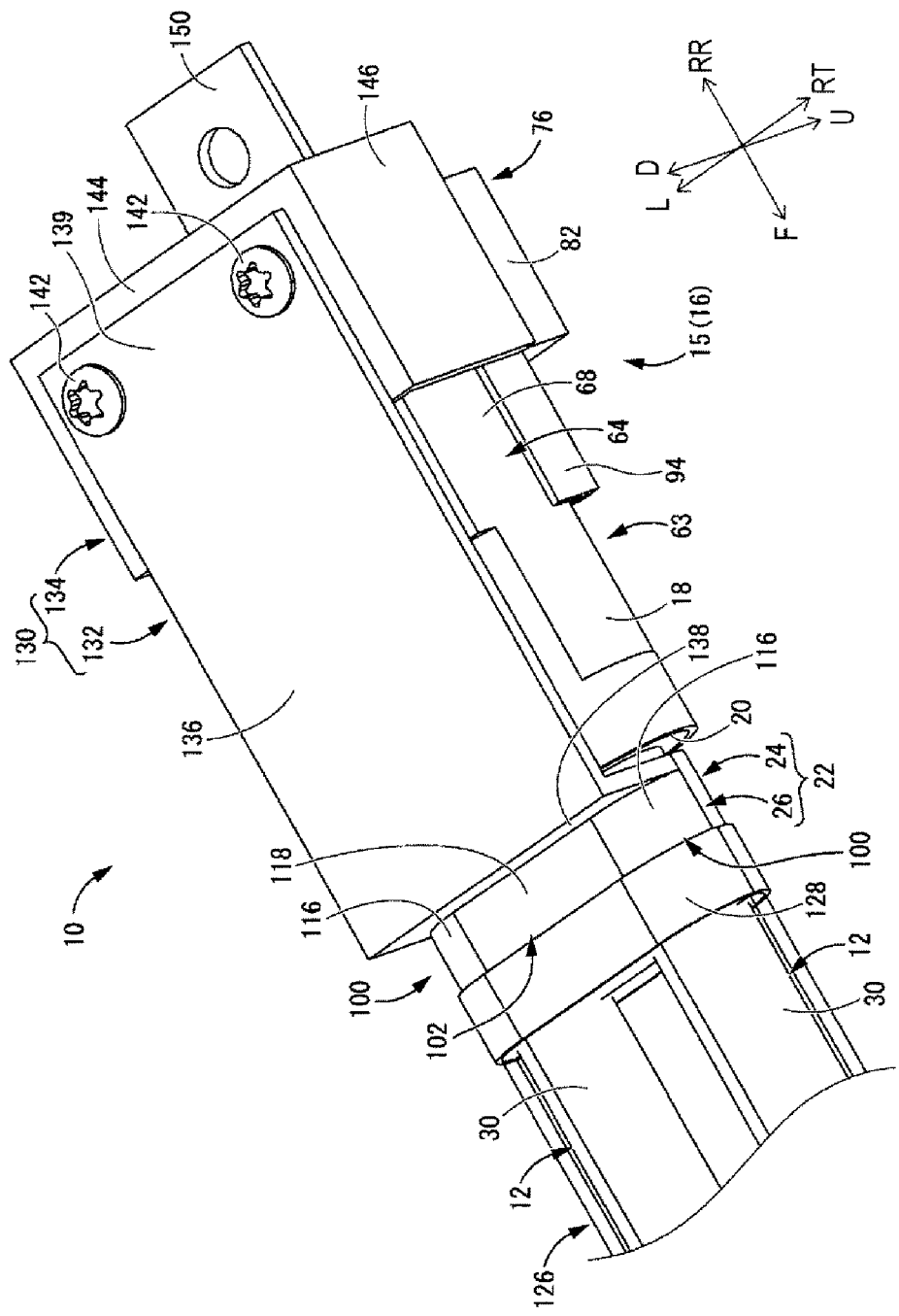
FIG. 2 is a perspective view of the connector shown in FIG. 1 when viewed from below.
Figure 3:
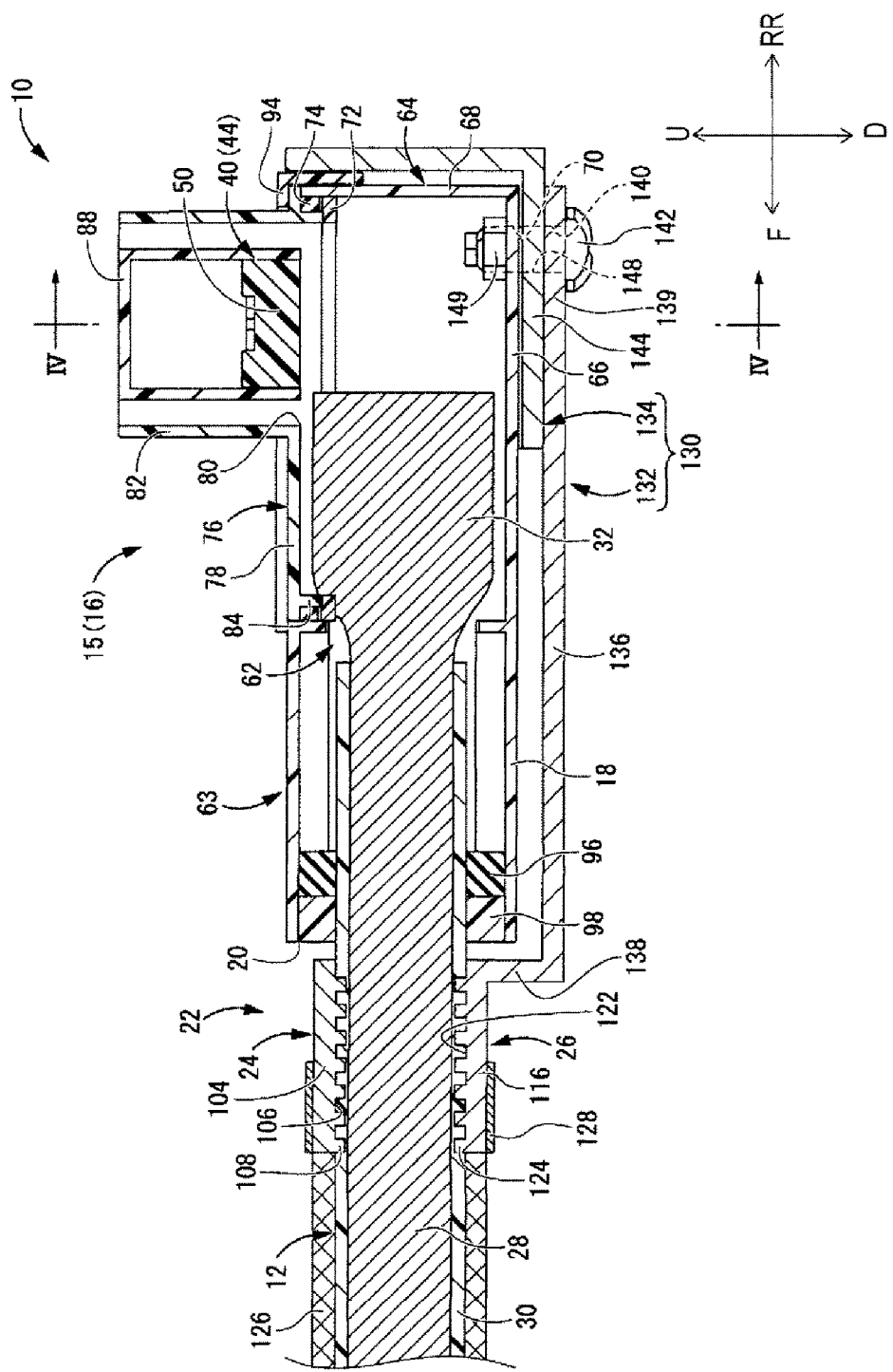
FIG. 3 is a longitudinal section along in FIG. 4 of the connector shown in FIG. 1.

First, embodiments of the present disclosure are listed and described.

(1) The connector of the present disclosure is provided with a connector housing including a wire draw-out opening, a terminal accommodated in the connector housing, a wire connected to the terminal, the wire being pulled out to outside of the connector housing through the wire draw-out opening, and a bracket made of metal, the bracket holding the wire pulled out through the wire draw-out opening, the bracket including a first holding portion and a second holding portion to be fixed to each other while sandwiching and holding the wire from both sides in a direction perpendicular to an axis of the wire and a fixing portion to the connector housing.

According to the connector of the present disclosure, the bracket for holding the wire pulled out through the wire draw-out portion is made of metal. Further, the bracket includes the first and second holding portions to be fixed to each other while sandwiching and holding the wire from the both sides in the direction perpendicular to the axis of the wire. Therefore, even under a high-temperature environment, the bracket is less likely to be deformed as compared to a conventional example in which a bracket is made of synthetic resin. As a result, a trouble that a clearance is formed between the wire pulled out through the wire draw-out portion and the bracket can be suppressed or hindered. Moreover, since the bracket includes the fixing portion to the connector housing and is fixed to the connector housing, an external force transmitted to the wire is also advantageously distributed to the connector housing. Therefore, even under the high-temperature environment, the transmission of an external force applied to the wire to a connected part of the wire and the terminal can be suppressed or hindered by suppressing or hindering the swing of the wire with respect to the connector housing.

Note that an arbitrary fixing structure such as fixing by a fastening tool such as a bolt or crimping can be adopted to fix the first and second holding portions. Further, any structure can be adopted for the fixing portion of the bracket as long as this structure can fix the bracket to the connector housing. For example, a fastening tool such as a bolt, a lock piece to be engaged with a lock protrusion provided on the connector housing and the like can be advantageously adopted.

(2) Preferably, at least one of contact surfaces of the first and second holding portions with the wire is provided with a pressure-contact rib to be pressed into contact with the wire. By providing the pressure-contact rib to be pressed into contact with the wire on at least one of the contact surfaces of the first and second holding portions with the wire, a displacement of the wire is further suppressed. In this way, the transmission of an external force from the wire to the connected part of the wire and terminal can be made difficult by more advantageously suppressing the swing of the wire with respect to the connector housing. Note that the pressure-contact rib can be provided to have an arbitrary shape. For example, a projection-like shape projecting toward the wire, a shape extending in a circumferential direction of the wire, a shape extending in a direction intersecting the circumferential direction of the wire and the like can be advantageously adopted.

(3) Preferably, the first and second holding portions include halved tubular portions forming a tubular shape for surrounding the wire by being assembled with each other and inner peripheral surfaces of the halved tubular portions serve as the contact surfaces with the wire, and a plurality of the pressure-contact ribs are provided apart from each other in an axial direction of the wire on the inner peripheral surfaces of the halved tubular portions of both the first and second holding portions and extend in the circumferential direction of the wire. Since the first and second holding portions include the halved tubular portions and the tubular shape for surrounding the wire is formed when the first and second holding portions are assembled, the wire can be stably held by the first and second holding portions. Moreover, since the plurality of pressure-contact ribs extend in the circumferential direction of the wire and are provided apart from each other in the axial direction on the inner peripheral surfaces of the halved tubular portions of the first and second holding portions, which are the contact surfaces with the wire, the wire can be more stably held against the swing and pulling of the wire.

(4) Preferably, each of the first and second holding portions includes a bolt insertion hole, and the first and second holding portions are fixed to each other by a fixing bolt inserted through the respective bolt insertion holes. The first and second holding portions can be fixed to each other easily and with a sufficient fixing force by the fixing bolt.

(5) Preferably, the connector housing includes a plurality of the wire draw-out openings and a plurality of the wires respectively connected to a plurality of the terminals are respectively pulled out through the plurality of wire draw-out openings, each of the first and second holding portions has a plurality of the contact surfaces to be brought into contact with the plurality of wires, and the fixing bolt is mounted while being located between the plurality of contact surfaces in an adjacent direction of the plurality of contact surfaces in the first and second holding portions. The fixing bolt for the first and second holding portions can be mounted, using a space between the plurality of wires adjacent and pulled out through the wire draw-out portions, and the plurality of wires can be fixed by a compact structure.

(6) Preferably, the connector is provided with a shield member for covering the wire and a first shielding conductive portion to be electrically connected to the shield member, the first shielding conductive portion being provided to cover the connector housing, the first shielding conductive portion being formed integrally with the bracket, the first shielding conductive portion being provided with the fixing portion. Since the first shielding conductive portion to be electrically connected to the shield member is provided to cover the connector housing, a shielding effect can be exhibited not only for the wire, but also for the connector housing and, eventually, the entire connector. Particularly, since the first shielding conductive portion is formed integrally with the bracket, it is also possible to reduce the number of components. Further, since the fixing portion is provided in the first shielding conductive portion, the fixing portion can be provided with a high degree of freedom in design.

(7) Preferably, the connector is provided with a second shielding conductive portion, the second shielding conductive portion being fastened to the connector housing together with the fixing portion provided in the first shielding conductive portion by a fastening bolt. By constituting a shielding conductive portion for covering the connector housing by a plurality of members, the shielding conductive portion can be easily manufactured, for example, even if the connector housing is large or complicated in shape. Particularly, the second shielding conductive portion is fastened to the connector housing using the fixing portion provided in the first shielding conductive portion. In this way, an improvement of workability in fixing the shielding conductive portion to the connector housing can be achieved by a compact structure, for example, as compared to the case where the first and second shielding conductive portions are separately fixed to the connector housing.

(8) Preferably, the shield member is fixed to the bracket. A shielding effect by the shield member can be exhibited only by fixing the shield member to an arbitrary part of the bracket made of metal and formed integrally with the first shielding conductive portion. Therefore, a structure for fixing the wire to the connector housing and a structure for shielding the wire can be provided with a small number of components.

DETAILS OF EMBODIMENT OF PRESENT DISCLOSURE

A specific example of a connector of the present disclosure is described with reference to the drawings. Note that the present disclosure is not limited to these illustrations, but is represented by claims and intended to include all changes in the scope of claims and in the meaning and scope of equivalents.

Embodiment

Hereinafter, a connector 10 of one embodiment of the present disclosure is described using FIGS. 1 to 11. The connector 10 is for electrically connecting in-vehicle devices, the in-vehicle device is electrically connected to wires 12 extending forward in FIG. 1 and male terminals 13 (see FIG. 4) of the mating in-vehicle device are electrically connected to a rear part in FIG. 1. Note that, although the connector 10 can be arranged in an arbitrary orientation, description is made using a vertical direction, a lateral direction and a front-rear direction shown in figures as a vertical direction, a lateral direction and a front-rear direction. Further, for a plurality of identical members, only some members may be denoted by a reference sign and the other members may not be denoted by the reference sign.

<Connector 10>

Figure 5:
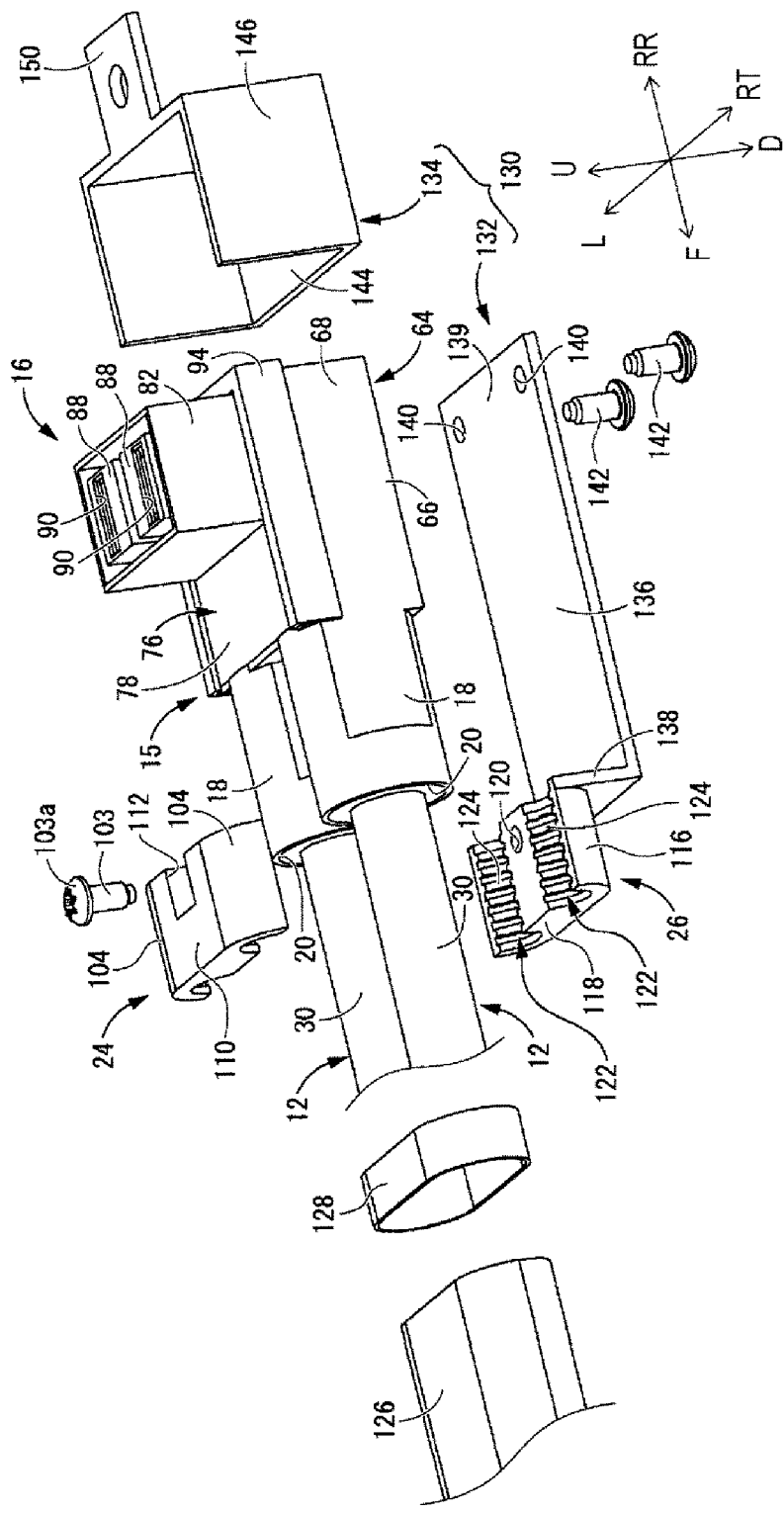
FIG. 5 is an exploded perspective view of the connector shown in FIG. 1.
Figure 6:
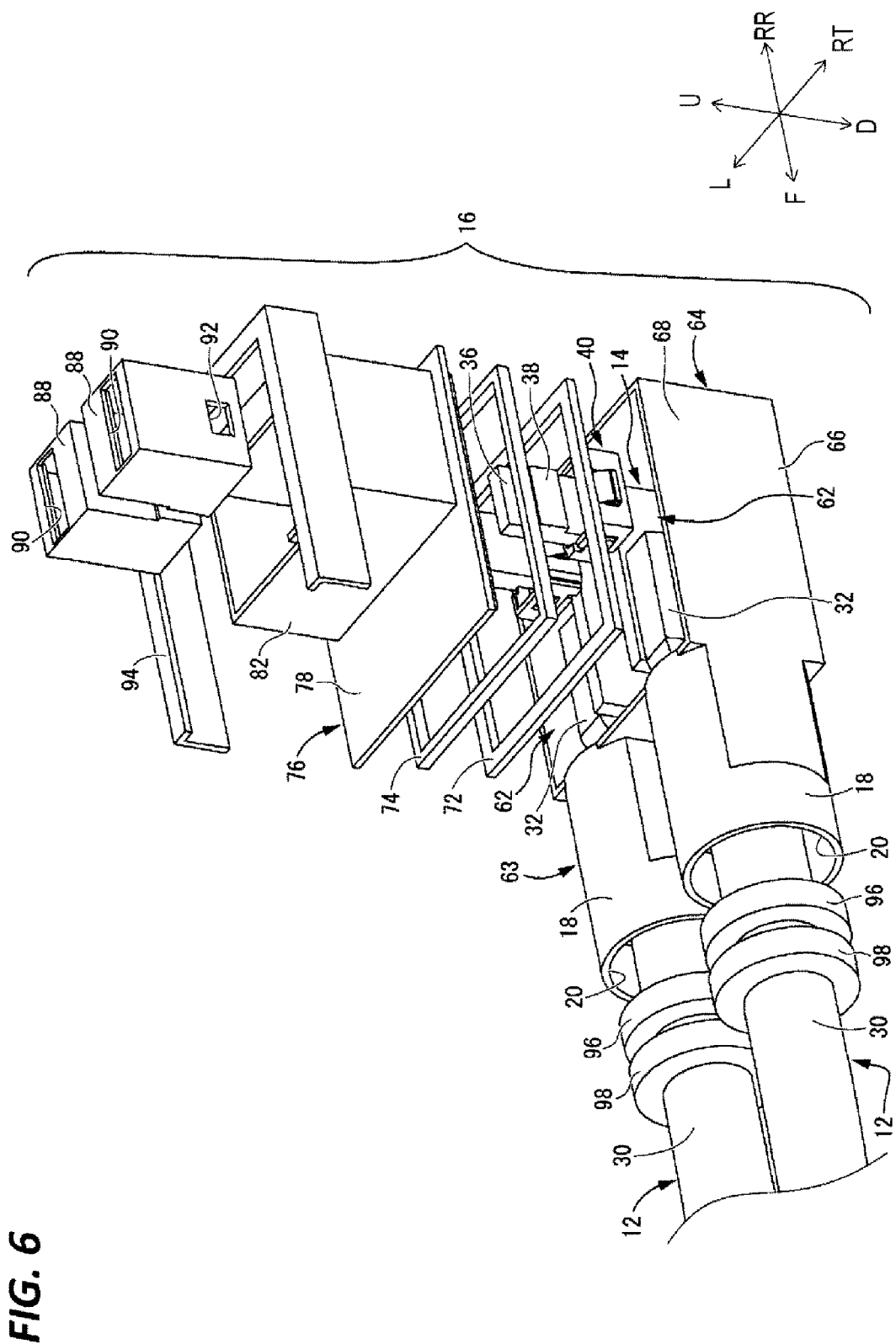
FIG. 6 is an exploded perspective view of a connector body constituting the connector shown in FIG. 1.

As also shown in FIGS. 5 and 6, the connector 10 of this embodiment includes two wires 12, 12, terminals 14, 14 to be connected to the respective wires 12, 12, and a connector housing 15 for accommodating these two terminals 14, 14. Further, the connector 10 includes a connector body 16 in which harness assemblies 62, 62 to be described later are accommodated in the connector housing 15. Tubular portions 18 formed into a substantially hollow cylindrical shape to cover the wires 12 are provided in a front part of the connector housing 15. In this embodiment, two tubular portions 18 are provided side by side in the lateral direction. Front openings of these tubular portions 18, 18 are wire draw-out openings 20, 20, and the wires 12, 12 connected to the terminals 14, 14 in the connector housing 15 are pulled out forward to the outside of the connector housing 15 through the wire draw-out openings 20, 20.

The wires 12, 12 pulled out forward through the wire draw-out openings 20, 20 are held by a bracket 22 made of metal. The bracket 22 includes a first holding portion 24 and a second holding portion 26 fixed to each other in a direction perpendicular to an axial direction of the wires 12, 12 extending along a length direction of the wires 12, 12. In this embodiment, the wires 12, 12 are sandwiched from both sides in the vertical direction, which is the direction perpendicular to axes of the wires 12, 12 by the first and second holding portions 24, 26. Further, the bracket 22 includes a later-described fixing portion 139 to the connector housing 15.

<Wires 12>

Figure 7:
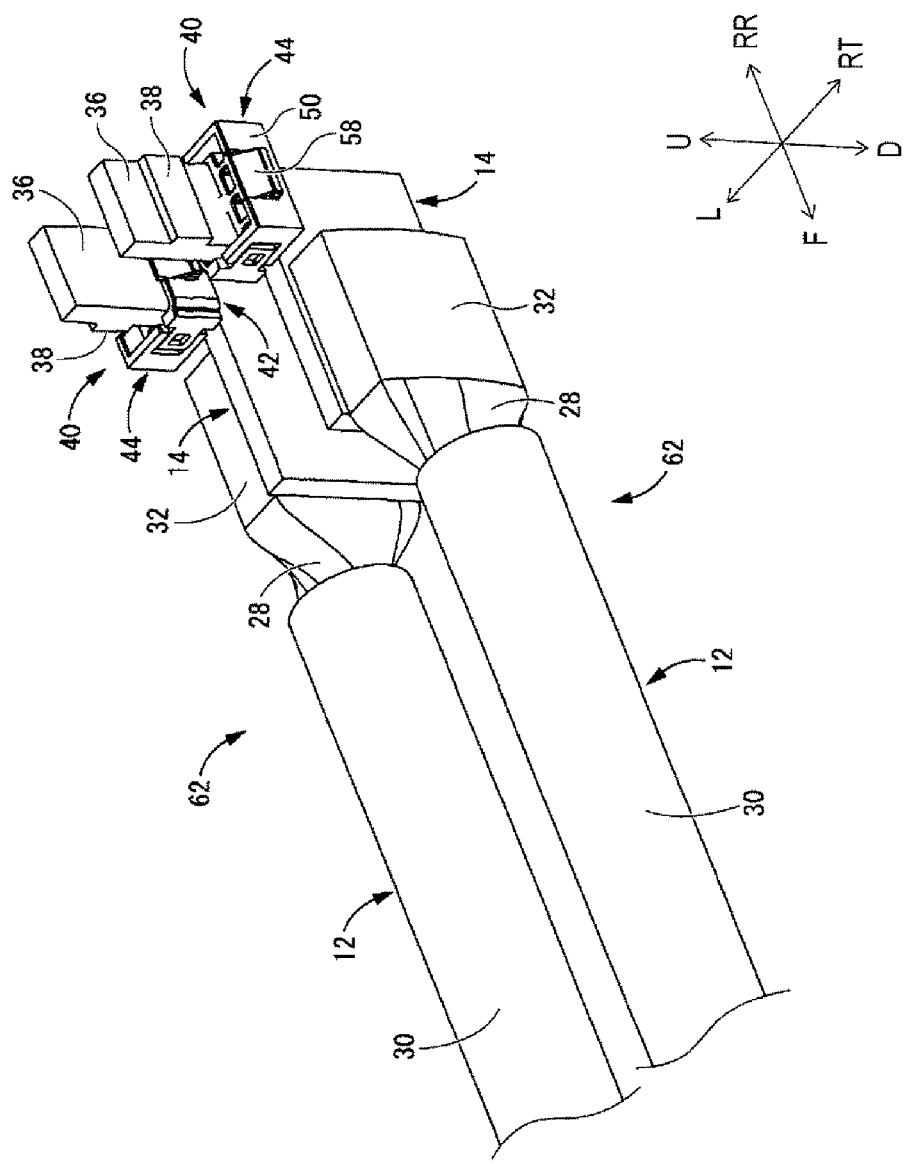
FIG. 7 is a perspective view showing harness assemblies in the connector body.

As also shown in FIG. 7, the wire 12 is a coated wire. That is, the wire 12 is configured such that a core wire 28 is covered around by an insulation coating 30 made of synthetic resin. The insulation coating 30 is stripped at a rear end part of the wire 12 to expose the core wire 28. This exposed core wire 28 constitutes a connecting portion 32 and is fixed to the terminal 14 by welding or the like, whereby the wire 12 is electrically connected to the terminal 14. In this embodiment, the pair of wires 12, 12 and the connecting portions 32, 32 are facing each other in the lateral direction, and the terminals 14, 14 are fixed to inner surfaces of the connecting portions 32, 32 facing each other.

<Terminals 14>

The terminal 14 is made of metal and in the form of a flat plate extending in the front-rear direction as a whole. A front part of the terminal 14 is fixed to the connecting portion 32. Accordingly, a connected part of the wire 12 and the terminal 14 includes a rear end part of the core wire 28, the connecting portion 32 and a front part of the terminal 14. An upward projecting portion 36 projecting upward is provided on a rear end part of the terminal 14. A part projecting laterally outward is provided in an intermediate part in the vertical direction of the upward projecting portion 36, and the projecting tip surface of this projecting part is a contact point portion 38 to be brought into contact with the male terminal 13 of the mating in-vehicle device shown by a two-dot chain line in FIG. 4. That is, the terminal 14 is a female terminal to be electrically connected to the male terminal 13 of the mating in-vehicle device.

In this embodiment, an insertion hole 39 penetrating in the lateral direction is provided in a lower end part of the upward projecting portion 36 in the terminal 14, and a retainer 40 is assembled with the terminal 14 using this insertion hole 39. This retainer 40 has a divided structure and is configured by assembling a first retainer 42 shown in FIG. 8 and a second retainer 44 shown in FIG. 9 with each other. Note that since the retainers 40, 40 to be assembled with the two terminals 14, 14 are both configured by assembling the first and second retainers 42, 44, the retainer 40 on a back side in FIG. 7 is described below. On a front side in FIG. 7, the retainer 40 is assembled with the terminal 14 bilaterally symmetrically with respect to the retainer 40 on the back side.

Figure 8:
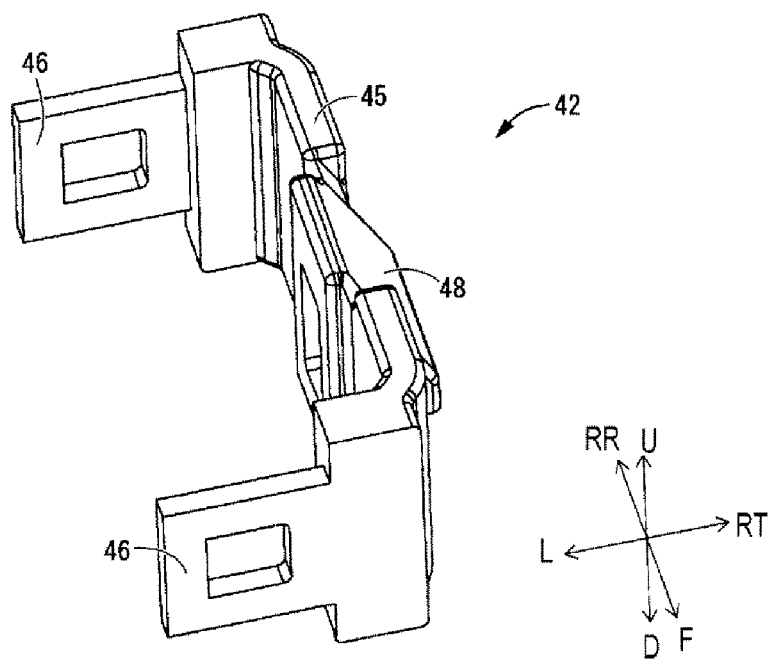
FIG. 8 is a perspective view showing one member constituting a retainer in the connector body.

The first retainer 42 shown in FIG. 8 includes a first wall portion 45 extending in the front-rear direction as a whole, and engaging wall portions 46, 46 projecting leftward are provided on both end parts in the front-rear direction of the first wall portion 45. Further, a locking protrusion 48 projecting rightward is provided in a central part in the front-rear direction of the first wall portion 45.

Figure 9:
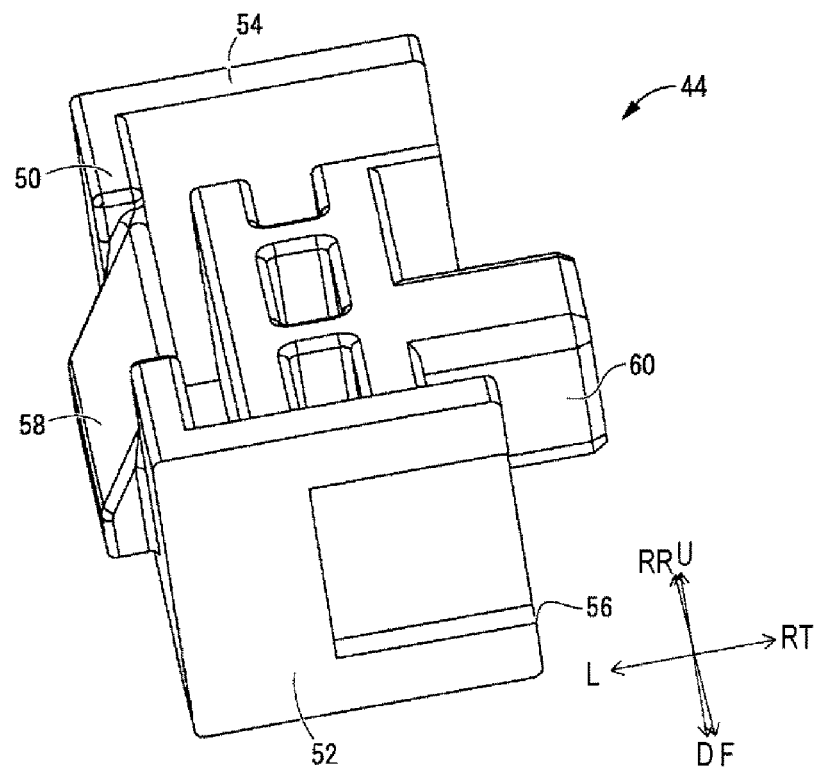
FIG. 9 is a perspective view showing another member constituting the retainer in the connector body.

The second retainer 44 shown in FIG. 9 includes a second wall portion 50 extending in the front-rear direction and facing the first wall portion 45 in the lateral direction when the second retainer 44 is assembled with the first retainer 42. A third wall portion 52 and a fourth wall portion 54 projecting rightward are provided on both end parts in the front-rear direction of the second wall portion 50, and engaging recesses 56 open rightward are provided in outer surfaces in the front-rear direction of these third and fourth wall portions 52, 54. Further, a locking protrusion 48 projecting leftward is provided in a central part in the front-rear direction of the second wall portion 50. Furthermore, a projecting portion 60 projecting rightward is provided in the central part in the front-rear direction of the second wall portion 50.

The projecting portion 60 of the second retainer 44 is inserted from the left into the insertion hole 39 provided in the lower end part of the upward projecting portion 36 in the terminal 14. The first retainer 42 is assembled with the second retainer 14 from the right, and the engaging wall portions 46, 46 of the first retainer 42 are fit into the engaging recesses 56, 56 of the second retainer 44.

For example, by press-fitting the engaging wall portions 46, 46 into the engaging recesses 56, 56, the first and second retainers 42, 44 are fixed to each other. Alternatively, the engaging wall portions 46, 46 may be provided with through holes penetrating in a thickness direction, protrusions may be provided on the inner surfaces of the engaging recesses 56, 56, and the first and second retainers 42, 44 may be fixed to each other by fitting these through holes and protrusions. The projecting portion 60 inserted into the insertion hole 39 of the upward projecting portion 36 may come into contact with the first wall portion 45 from the left, may be separated from the first wall portion 45 or may be fit into a recess provided in the left end surface of the first wall portion 45.

In this way, the retainer 40 is assembled to cover a lower end part of the upward projecting portion 36 in the terminal 14 with the first, second, third and fourth wall portions 45, 50, 52 and 54. Since the locking protrusions 48, 58 project outward on both left and right sides of the retainer 40, the locking protrusions 48, 58 project laterally outward with respect to the upward projecting portion 36.

As just described, the connecting portion 32, the terminal 14 and the retainer 40 are directly or indirectly mounted on the wire 12, thereby configuring the harness assembly 62 shown in FIG. 7. In this embodiment, a pair of the harness assemblies 62 are formed.

<Connector Housing 15>

The connector housing 15 includes a housing body 63. As shown in FIG. 6, the tubular portions 18 are provided in a front part of the housing body 63 and a box-like portion 64 open upward is provided in a rear part of the housing body 63. That is, the box-like portion 64 has a bottom wall 66 in the form of a rectangular flat plate, and a peripheral wall 68 projecting upward is provided on an outer peripheral edge part of the bottom wall 66. A pair of the tubular portions 18, 18 are integrally formed on a front wall portion constituting the peripheral wall 68. In this way, rear openings of the tubular portions 18, 18 are provided in the inner surface of the peripheral wall 68 in the box-like portion 64, and an internal space of the box-like portion 64 communicates with an outside space via the tubular portions 18, 18. Bolt insertion holes 70 (see FIGS. 3 and 4) through which fastening bolts 142 to be described later are inserted are provided in the bottom wall 66 of the box-like portion 64. A spacer 72 and a sealing rubber 74 in the form of rectangular frames are inserted through an upper opening of the box-like portion 64 and arranged along the inner peripheral surface of the box-like portion 64. The upper opening of the box-like portion 64 is covered by a lid member 76.

Figure 4:
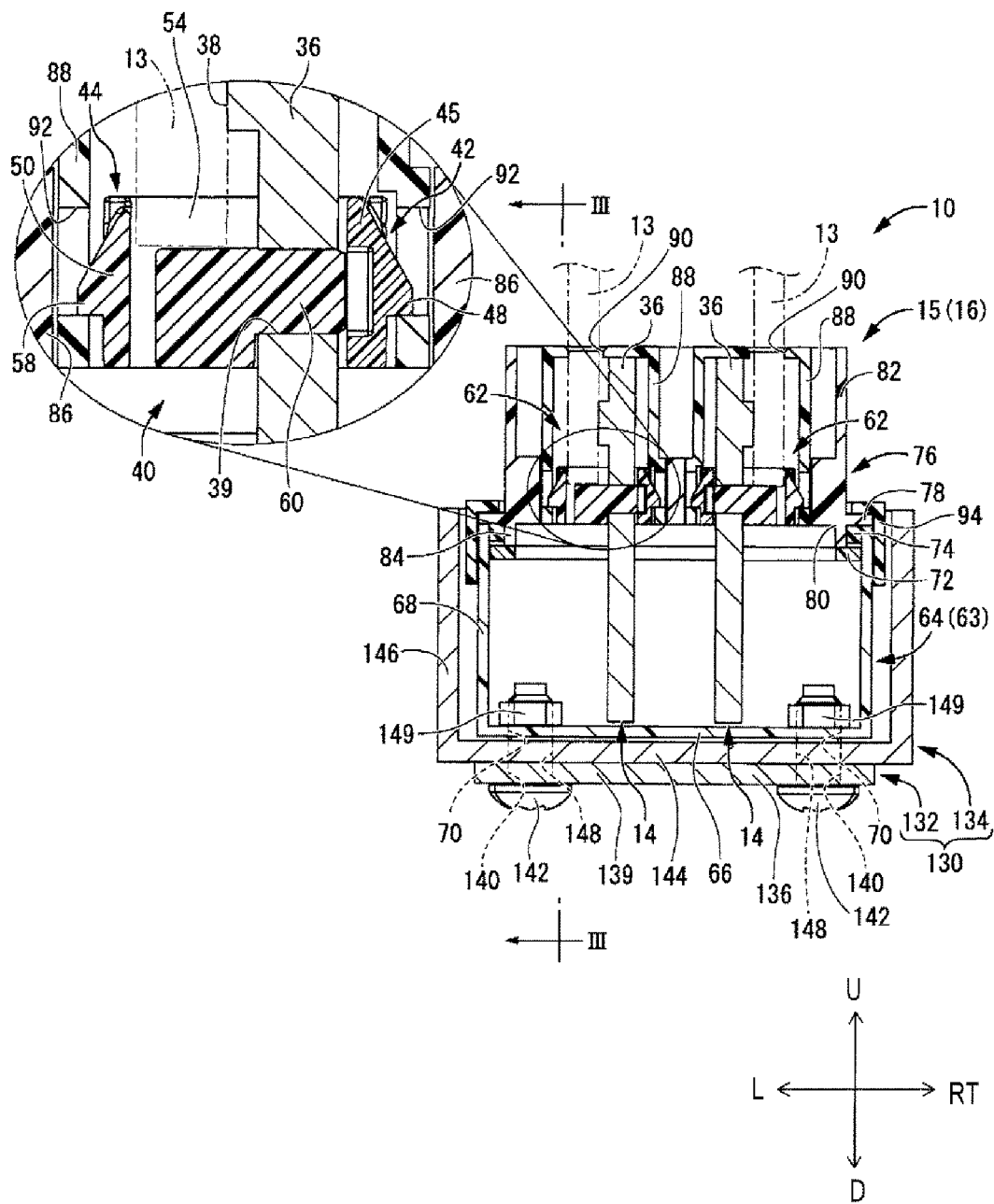
FIG. 4 is a section along IV-IV in FIG. 3.

The lid member 76 includes a rectangular flat plate portion 78 shaped to correspond to the upper opening of the box-like portion 64. This flat plate portion 78 is formed with a rectangular through hole 80 penetrating in the vertical direction, and an outer wall portion 82 in the form of a rectangular tube projecting upward is provided on an opening peripheral edge part of the through hole 80. Further, a downward projecting portion 84 (see FIGS. 3 and 4) in the form of a rectangular tube projecting downward is provided on the opening peripheral edge part of the through hole 80. In this way, when the lid member 76 is assembled with the box-like portion 64, the sealing rubber 74 is compressed between the downward projecting portion 84 and the peripheral wall 68, thereby sealing between the flat plate portion 78 and the peripheral wall 68 in a liquid-tight manner. As shown in FIG. 4, a rib 86 projecting inward is formed on the inner peripheral surface of the outer wall portion 82.

Further, a pair of inner wall portions 88, 88 are provided inside the outer wall portion 82. Each of the inner wall portions 88 is in the form of a rectangular bottomed tube open downward as a whole, and an upper bottom wall is formed with a terminal insertion hole 90, which penetrates in the vertical direction and through which the male terminal 13 of the mating in-vehicle device is inserted. Locking holes 92 penetrating in the lateral direction are formed on both lateral sides of a lower end part of the peripheral wall of the inner wall portion 88.

Assembled parts of the box-like portion 64 and the lid member 76 with the flat plate portion 78 are fixed from above by a retainer 94. That is, an outer peripheral edge part of the flat plate portion 78 is overlapped on a peripheral edge part of the upper opening of the box-like portion 64 and both left and right sides and a rear side of the overlapping part of these is covered by the retainer 94. The retainer 94 can be fixed to the peripheral edge part of the upper opening of the box-like portion 64 and the outer peripheral edge part of the flat plate portion 78 by fixing means such as press-fitting, adhesion or welding. In this way, the separation of the lid member 76 from the box-like portion 64 can be prevented.

In this embodiment, the connector housing 15 is configured to include these housing body 63, lid member 76, inner wall portions 88, 88, retainer 94 and the like.

<Connector Body 16>

The connector body 16 is configured by accommodating the aforementioned harness assemblies 62 into the above connector housing 15. That is, the wires 12 in the harness assemblies 62 are inserted through the tubular portions 18 in the housing body 63, and the connecting portions 32 and the terminals 14 are accommodated in the box-like portion 64. By assembling the lid member 76 with the upper opening of the box-like portion 64, the upward projecting portions 36 in the terminals 14 project further upward than the flat plate portion 78 through the upper opening of the box-like portion 64 and the through hole 80 of the lid member 76. In this way, the peripheries of the upward projecting portions 36 projecting upward are covered by the outer wall portion 82.

By bringing the inner wall portion 88 closer to the upward projecting portion 36 of the terminal 14 located on an inner peripheral side of the outer wall portion 82 from above, the locking protrusions 48, 58 of the retainer 40 projecting toward both left and right sides from the upward projecting portion 36 are locked into the locking holes 92 of the inner wall portion 88. In this way, the inner wall portion 88 is assembled with the upward projecting portion 36 of the terminal 14. Particularly, the peripheral wall of the inner wall portion 88 comes into contact with the rib 86 provided on the inner peripheral surface of the outer wall portion 82 on the lid member 76, whereby the inner wall portion 88 is assembled without being inclined with respect to the upward projecting portion 36. In this way, since the upward projecting portion 36 of the terminal 14 is covered by the inner wall portion 88 and the outer wall portion 82 in an assembled state of the connector 10 shown in FIG. 1 and the like, unintended contact, damage and the like with the upward projecting portion 36 are effectively prevented.

A sealing member 96 and a retaining member 98, which are both annular, are externally fit to the wire 12 inserted through the tubular portion 18 of the housing body 63. These sealing member 96 and retaining member 98 are inserted and accommodated into the tubular portion 18 through the wire draw-out opening 20, which is the front opening of the tubular portion 18. Note that the sealing member 96 is arranged in a compressed state in a radial direction between the wire 12 and the tubular portion 18. As a result, sealing is provided between the wire 12 and the tubular portion 18 in a liquid-tight manner by the sealing member 96.

The retaining member 98 is formed of a hard material such as metal or synthetic resin, and arranged in front of the sealing member 96. The retaining member 98 is locked to the wire draw-out opening 20 by an unillustrated arbitrary structure, thereby preventing the sealing member 96 from coming out through the wire draw-out opening 20, which is the front opening of the tubular portion 18.

<Bracket 22>

The bracket 22 of this embodiment includes tubular parts 100, 100 for holding the wires 12, 12 adjacent in the lateral direction and surrounding the respective wires 12, 12. These tubular parts 100, 100 adjacent in the lateral direction are coupled to each other by a coupling part 102 in a central part in the lateral direction. In this embodiment, the both tubular parts 100, 100 have a hollow cylindrical shape. As described above, the bracket 22 includes the first holding portion 24 located on an upper side and the second holding portion 26 located on a lower side. That is, later-described halved tubular portions 104, 104 in the first holding portion 24 and later-described halved tubular portions 116, 116 in the second holding portion 26 are assembled with each other, thereby configuring the tubular parts 100, 100. Further, a later-described upper coupling portion 110 in the first holding portion 24 and a later-described lower coupling portion 118 in the second holding portion 26 are assembled with each other, thereby configuring the coupling part 102. These first and second holding portions 24, 26 are respectively provided with later-described bolt insertion holes 114, 120 in the coupling part 102. By inserting a fixing bolt 103 into these bolt insertion holes 114, 120 and tightening the fixing bolt 103, the first and second holding portions 24, 26 are fixed to each other.

<First Holding Portion 24>

Figure 10:
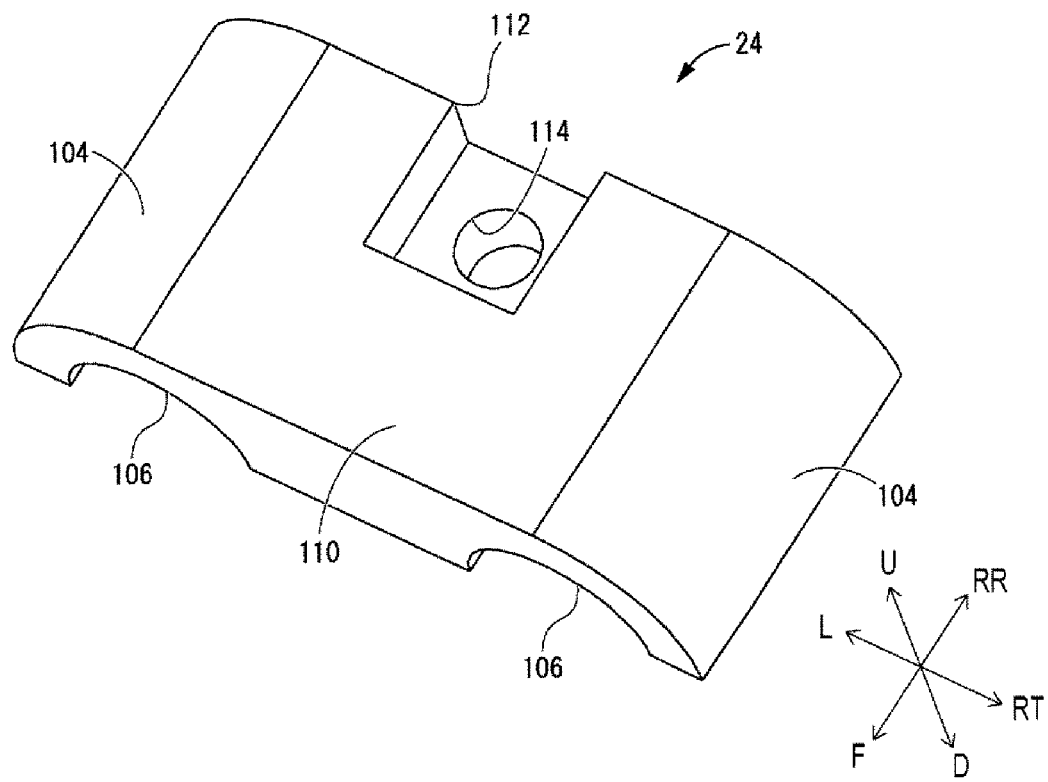
FIG. 10 is a perspective view of a first holding portion when viewed from above.
Figure 11:
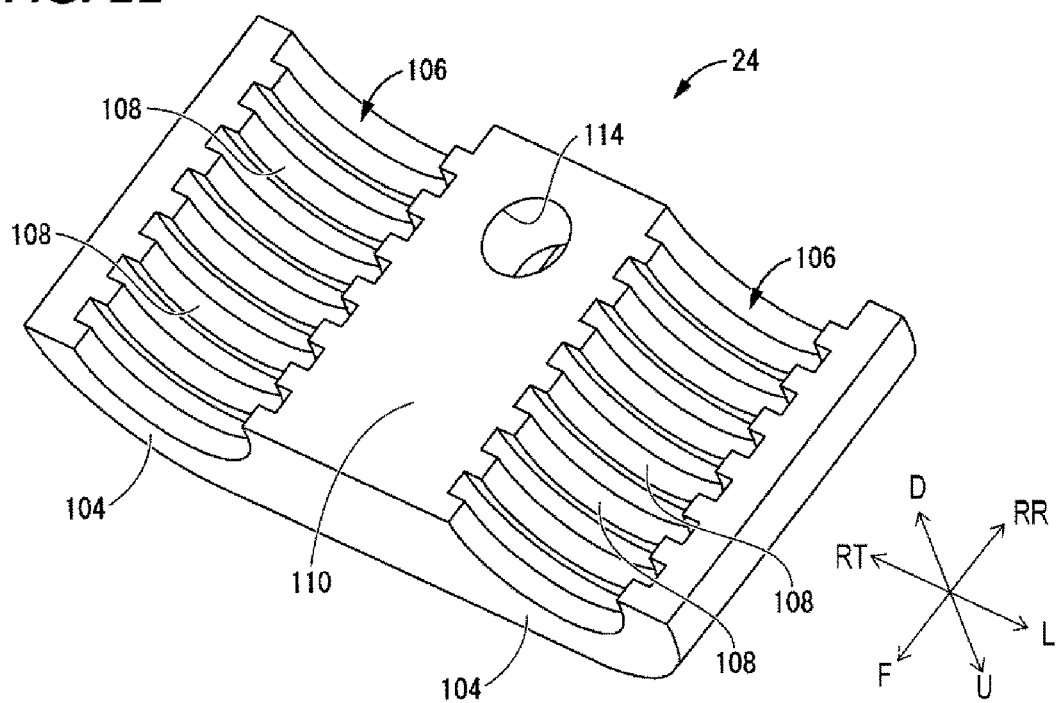
FIG. 11 is a perspective view of the first holding portion when viewed from below.

As shown in FIGS. 10 and 11, the first holding portion 24 includes the halved tubular portions 104, 104 constituting upper halves of the tubular parts 100, 100. Since the pair of tubular parts 100, 100 are adjacent in the lateral direction in this embodiment, the first holding portion 24 includes the pair of halved tubular portions 104, 104 adjacent in the lateral direction. Each of these halved tubular portions 104, 104 has a semi-cylindrical shape. The inner peripheral surface of the halved tubular portion 104 is a contact surface 106 to be brought into contact with the wire 12.

Pressure-contact ribs 108 to be pressed into contact with the wire 12 in holding the wire 12 are provided to project toward an inner peripheral side on each contact surface 106. In this embodiment, the pressure-contact ribs 108 extend in a circumferential direction of the wire 12 and are formed to have a semicircular ring shape extending over an entire length in the circumferential direction of the inner peripheral surface (contact surface 106) of each halved tubular portion 104. Further, a plurality of the pressure-contact ribs 108 are provided and separated from each other in the front-rear direction serving as an axial direction of the wire 12.

The halved tubular portions 104, 104 adjacent in the lateral direction are coupled by the upper coupling portion 110 constituting the upper half of the coupling part 102. Both upper and lower surfaces of the upper coupling portion 110 are flat surfaces, and the outer peripheral surfaces of the halved tubular portions 104, 104 adjacent in the lateral direction are smoothly connected by the upper surface of the upper coupling portion 110. Further, the contact surfaces 106, 106, which are the inner peripheral surfaces of the halved tubular portions 104, 104, are connected to the lower surface of the upper coupling portion 110.

In this embodiment, an accommodation recess 112 for accommodating a head part 103a of the fixing bolt 103 is formed in a rear part of the upper coupling portion 110, and a bolt insertion hole 114 penetrating in the vertical direction is formed in the bottom wall of the accommodation recess 112. That is, in the first holding portion 24, the two contact surfaces 106, 106 are adjacent in the lateral direction and the bolt insertion hole 114 is formed between these contact surfaces 106, 106 in an adjacent direction (lateral direction).

<Second Holding Portion 26>

The second holding portion 26 is structured similarly to the first holding portion 24. That is, the second holding portion 26 includes the halved tubular portions 116, 116 constituting lower halves of the tubular parts 100, 100 adjacent in the lateral direction, and these halved tubular portions 116, 116 are coupled by the lower coupling portion 118 constituting a lower half of the coupling part 102. Each of these halved tubular portions 116, 116 has a semi-cylindrical shape. Further, in the lower coupling portion 118, a bolt insertion hole 120 is formed at a position corresponding to the bolt insertion hole 114 of the upper coupling portion 110 in the lower coupling portion 118. An internal thread is, for example, formed on the inner peripheral surface of this bolt insertion hole 120, and threadably engageable with an external thread formed on the fixing bolt 103.

The inner peripheral surfaces of the halved tubular portions 116 are contact surfaces 122 to be brought into contact with the wire 12, and each contact surface 122 is provided with pressure-contact ribs 124 projecting toward an inner peripheral side and to be pressed into contact with the wire 12. The pressure-contact ribs 124 in the second holding portion 26 are shaped similarly to the pressure-contact ribs 108 in the first holding portion 24. That is, a plurality of the pressure-contact ribs 124 are provided apart from each other in the front-rear direction, and each pressure-contact rib 124 has a semicircular ring shape extending in the circumferential direction. Also in the second holding portion 26, the two contact surfaces 122, 122 are adjacent in the lateral direction, and a bolt insertion hole 120 is formed between these contact surfaces 122, 122 in an adjacent direction (lateral direction).

In this embodiment, the plurality of pressure-contact ribs 108 in the first holding portion 24 and the plurality of pressure-contact ribs 124 in the second holding portion 26 are formed at the same positions in the front-rear direction. In this way, with the first and second holding portions 24, 26 assembled, pressure-contact ribs having an ring shape are configured by the pressure-contact ribs 108 in the first holding portion and the pressure-contact ribs 124 in the second holding portion 26 in the tubular parts 100, 100 of the bracket 22. Therefore, the pressure-contact ribs are pressed into contact with the outer peripheral surfaces of the wires 12 over the entire periphery in the circumferential direction.

By fixing the first and second holding portions 24, 26 as described above, the bracket 22 is mounted on the wires 12 pulled out forward through the wire draw-out openings 20. That is, the bracket 22 is provided forward of the retaining members 98 mounted in the connector housing 15. In this embodiment, the bracket 22 and the retaining members 98 are separated by a short facing distance in the front-rear direction. Therefore, the detachment of the retaining members 98 from the connector housing 15 is prevented also by the bracket 22, whereby the detachment of the sealing members 96 from the connector housing 15 is further prevented.

<Shield Member 126>

The wires 12, 12 pulled out forward through the wire draw-out openings 20 of the connector housing 15 and held by the bracket 22 are electromagnetically shielded by a shield member 126. In this embodiment, the shield member 126 has a tubular shape extending in the front-rear direction as a whole and is formed by braiding thin wires made of metal. Particularly, in this embodiment, the shield member 126 is formed as one tubular body sized to be able to cover a front part of the bracket 22 holding the wires 12, 12 adjacent in the lateral direction. Although the shield member 126 is shown in mesh in FIG. 3, the shield member 126 is shown as a mere tubular body for easy visibility in other figures. A braided structure of the shield member 126 is not limited, and any one of conventionally known braided structures, woven structures and the like can be adopted. The shield member 126 is electrically connected to a shielding conductive portion 130 to be described later, and grounded via the shielding conductive portion 130.

In this embodiment, the shield member 126 is fixed to the bracket 22. Specifically, after a rear end part of the shield member 126 is externally fit to the front part of the bracket 22, a crimp band 128 made of metal is reduced in diameter and crimped from an outer peripheral side of the shield member 126, whereby the shield member 126 is fixed to the bracket 22. The crimp band 128 is, for example, a strip-like member and can be reduced in diameter by inserting another end part in a length direction into a lock portion provided on one end part in the length direction. Note that since the crimp band 128 is reduced in diameter with the first and second holding portions 24, 26 overlapped, the fixing of the first and second holding portions 24, 26 is achieved also by the crimp band 128.

<Shielding Conductive Portion 130>

The shielding conductive portion 130 for ground-connecting the shield member 126 extends out rearward from the shield member 126. In this embodiment, the shielding conductive portion 130 covers the connector housing 15 over an entire length in the front-rear direction and extends further rearward than the connector housing 15. The shielding conductive portion 130 of this embodiment includes a first shielding conductive portion 132 and a second shielding conductive portion 134 both made of metal.

<First Shielding Conductive Portion 132>

The first shielding conductive portion 132 includes a flat plate portion 136 sized to be able to cover the connector housing 15 over the entire length in the front-rear direction. A front end part of this flat plate portion 136 is coupled to a rear end part of the second holding portion 26 constituting the bracket 22 by a coupling portion 138. That is, in this embodiment, the first shielding conductive portion 132 is formed integrally with the second holding portion 26 constituting the bracket 22. The second holding portion 26 and the first shielding conductive portion 132 cover the connector housing 15 from below.

In a rear end part of the flat plate portion 136, a fixing portion 139 for fixing the bracket 22 to the connector housing 15 is provided at a position to cover the bolt insertion holes 70 provided in the bottom wall 66 in the box-like portion 64 of the connector housing 15. The fixing portion 139 is formed with bolt insertion holes 140 at positions corresponding to the bolt insertion holes 70. That is, the fastening bolts 142 can be inserted with the flat plate portion 136 of the first shielding conductive portion 132 and the connector housing 15 overlapped and the both bolt insertion holes 70, 140 aligned with each other.

<Second Shielding Conductive Portion 134>

The second shielding conductive portion 134 is substantially in the form of a box open forward and upward. That is, the second shielding conductive portion 134 has a bottom wall 144 and a side wall 146 projecting upward from an outer peripheral edge part of the bottom wall 144 to cover both left and right sides and a rear side. This second shielding conductive portion 134 is sized to be able to cover a rear end part of the connector body 16. In the bottom wall 144, bolt insertion holes 148 are formed at positions corresponding to the bolt insertion holes 70 of the connector housing 15. That is, the fastening bolts 142 can be inserted with the bottom wall 144 of the second shielding conductive portion 134 and the flat plate portion 136 of the first shielding conductive portion 132 overlapped on the bottom wall 66 of the connector housing 15 and the both bolt insertion holes 70, 140 and 148 aligned. By threadably engaging the fastening bolts 142 with nuts 149 accommodated inside the connector housing 15, the first and second shielding conductive portions 132, 134 are fixed to the connector housing 15. In short, the fixing portion 139 provided in the first shielding conductive portion 132 and the second shielding conductive portion 134 are fastened together to the connector housing 15 by the fastening bolts 142. In this way, the first and second shielding conductive portions 132, 134 are electrically connected. Further, as a result, the bracket 22 including the second holding portion 26 formed integrally with the first shielding conductive portion 132 is fixed to the connector housing 15.

An external connecting portion 150 projecting rearward is provided on an upper end part of a rear wall portion in the side wall 146 of the second shielding conductive portion 134. This external connecting portion 150 is, for example, electrically connected to a metal case or the like. In this way, the shielding conductive portion 130 (first and second shielding conductive portions 132, 134) extending from the shield member 126 to the metal case is configured to include the bracket 22 (second holding portion 26), and the shield member 126 is ground-connected. Particularly, since the first shielding conductive portion 132 is sized to be able to cover the connector housing 15 in this embodiment, a shielding effect can be exhibited also for the connector housing 15.

<Assembling Method of Connector 10>

One specific example of an assembling method of the connector 10 is described below. Note that the assembling method of the connector 10 is not limited to the following method.

First, the wires 12, the terminals 14 and the retainers 40 are prepared. After the insulation coating of the wire 12 is stripped to expose the core wire 28, the terminal 14 is fixed to the exposed core wire 28 via the connecting portion 32. The retainer 40 is assembled with this terminal 14. In this way, the harness assembly 62 shown in FIG. 7 is formed. Note that a pair of the harness assemblies 62 are formed.

Thereafter, the housing body 63 is prepared and these harness assemblies 62, 62 are accommodated into the housing body 63 as shown in FIG. 6. That is, end parts of the wires 12, 12 of the harness assemblies 62, 62 on a side opposite to the connecting portions 32, 32 are inserted into the tubular portions 18, 18 of the housing body 63 and the wires 12, 12 are arranged in a state inserted in the tubular portions 18, 18. Subsequently, the connecting portions 32, 32 and the terminals 14, 14 are arranged in the box-like portion 64. Then, the spacer 72, the sealing rubber 74, the lid member 76, the retainer 94 and the inner wall portions 88 are successively assembled in the box-like portion 64. Further, the sealing members 96, 96 and the retaining members 98, 98 externally fit to the wires 12, 12 are inserted through the wire draw-out openings 20 of the tubular portions 18, 18 and accommodated at predetermined positions in the tubular portions 18, 18. In this way, the harness assemblies 62, 62 are accommodated in the connector housing 15 to form the connector body 16 shown in FIG. 5.

The first and second holding portions 24, 26 are overlapped on the wires 12, 12 extending out forward through the wire draw-out openings 20, 20 in the connector body 16 from both upper and lower sides, and the first and second holding portions 24, 26 are fixed by the fastening bolt 103. Further, the second shielding conductive portion 134 is overlapped on the rear end part of the connector body 16, and the fixing portion 139 of the first shielding conductive portion 132 and the second shielding conductive portion 134 are fixed to the connector housing 15 by the fastening bolts 142. Further, the rear end part of the shield member 126 is externally fit to the front part of the bracket 22 and fixed by the crimp band 128. In this way, the connector 10 is completed.

In the connector 10 of this embodiment, a member for holding the wires 12 connected to the terminals 14 and pulled out through the wire draw-out openings 20 of the connector housing 15 is the bracket 22 made of metal. Thus, deformation is unlikely to occur even under a high-temperature environment and a possibility of forming a clearance between the wires 12 and the bracket 22 is reduced as compared to the case where a member for holding the wires 12 is made of resin as in the conventional example. In this way, the transmission of an external force to connected parts of the wires 12 and the terminals 14 can be made difficult by suppressing or hindering the swing of the wires 12. Further, since the bracket 22 is fixed to the connector housing 15 at the fixing portion 139, an external force such as the swing of the wires 12 can be distributed to the connector housing 15 via the bracket 22. In this way, the transmission of an external force to the connected parts of the wires 12 and the terminals 14 can be further suppressed.

The inner peripheral surfaces of the halved tubular portions 104, 116 in the first and second holding portions 24, 26 are the contact surfaces 106, 122 with the wires 12, and these contact surfaces 106, 122 are provided with the pressure-contact ribs 108, 124 to be pressed into contact with the wires 12. In this way, the swing of the wires 12 is further suppressed and an external force associated with the swing is less likely to be transmitted to the connected parts of the wires 12 and the terminals 14. In this embodiment, the plurality of pressure-contact ribs 108 and the plurality of pressure-contact ribs 124 are provided and separated from each other in the axial direction, and have a semicircular ring shape extending in the circumferential direction of the wires 12. In this way, large contact areas of the pressure-contact ribs 108, 124 and the wires 12 can be secured, and an effect of suppressing the swing of the wires 12 can be stably exhibited.

The first and second holding portions 24, 26 can be easily and firmly fixed by being fixed by the fixing bolt 103. Particularly, since the fixing bolt 103 is mounted through the coupling part 102 located between the tubular parts 100 and 100 for holding the two wires 12, 12 in the bracket 22, a mounting region of the fixing bolt 103 can be secured with good space efficiency.

The shield member 126 for electromagnetically shielding the wires 12 is ground-connected via the shielding conductive portion 130. The shielding conductive portion 130 includes the first and second shielding conductive portions 132, 134, and the first shielding conductive portion 132 is formed integrally with the second holding portion 26. In this way, the number of components is reduced. Further, the first shielding conductive portion 132 is formed in a size to cover the connector housing 15, and exhibits a shielding effect also for the connector housing 15. By forming the large first shielding conductive portion 132 in this way, the fixing portion 139 to the connector housing 15 is easily provided and a degree of freedom in design is improved.

The shielding conductive portion 130 for covering the connector housing 15 is composed of a plurality of members (first and second shielding conductive portions 132, 134). In this way, a shielding conductive portion can be easily formed, for example, even if a connector housing is large or complicated in shape. Particularly, the second shielding conductive portion 134 is fastened to the connector housing 15 together with the fixing portion 139 of the first shielding conductive portion 132 by the fastening bolts 142. In this way, the number of components is reduced and workability is improved as compared to the case where first and second shielding conductive portions are separately fixed to a connector housing.

The shielding conductive portion 130 includes the bracket 22, and the shield member 126 can be ground-connected by fixing the shield member 126 to the bracket 22. Therefore, the shield member 126 is ground-connected with a simple structure and a small number of components.

<Modifications>

Although the embodiment has been described in detail as a specific example of the present disclosure, the present disclosure is not limited by the description of the specific example. Modifications, improvements and the like are included in the present disclosure within the scope that can achieve the object of the present disclosure. For example, the following modifications of the embodiment are also included in the technical scope of the present disclosure.

(1) Although the bracket 22 is composed of two members including the first and second holding portions 24, 26 in the above embodiment, a bracket may be, for example, composed of three members. That is, a third holding portion may be provided between the both wires 12, and first and second holding portions for sandwiching and holding the both wires 12 and the third holding portion from both upper and lower sides may be provided and fixed to each other. In this case, the first, second and third holding portions may be fastened between the both wires 12 by a fixing bolt, but the first and second holding portions may be, for example, provided with parts projecting laterally outward and these projecting parts may serve as fixing bolt mounting regions.

(2) Although two wires 12, 12 are provided in the above embodiment, one, three or more wires 12 may be provided.

(3) The direction perpendicular to the axes of the wires 12, in which the wires 12 are sandwiched by the first and second holding portions 24, 26, is not limited to the vertical direction, and may be, for example, the lateral direction.

(4) The bracket 22 is not limited to the one in which the first and second holding portions 24, 26 are separate bodies as in the above embodiment. A bracket may be structured such that one end parts of first and second holding portions are coupled by a hinge portion. In this case, the first and second holding portions can be opened and closed about the hinge portion, and the wires 12 can be held by the bracket by fixing the other end parts of the first and second holding portions to each other after the first and second holding portions are opened and wires are sandwiched between these holding portions.

(5) Although both the tubular parts 100, 100 for surrounding the wires 12, 12 in the bracket 22 have a hollow cylindrical shape in the above embodiment, the tubular parts 100, 100 may have a rectangular tube shape.

(6) In the above embodiment, the first and second holding portions 24, 26 are fixed by the fastening bolt 103 and the crimp band 128. However, for example, either one of these may be used.

(7) In the above embodiment, both the inner peripheral surfaces (contact surfaces 106) of the halved tubular portions 104 in the first holding portion 24 and the inner peripheral surfaces (contact surfaces 122) of the halved tubular portions 116 in the second holding portion 26 are provided with the pressure-contact ribs 108, 124. However, pressure-contact ribs may be provided on the inner peripheral surfaces of either one of the holding portions or may not be provided. Even if the pressure-contact ribs are provided, the pressure-contact ribs are not limited to those having a semicircular ring shape as in the above embodiment and may have an arbitrary shape such as a projection-like shape, a shape extending in the axial directions of the wires or a spiral shape. Further, the pressure-contact ribs in the first holding portion and those in the second holding portion need not be provided at the same positions in the front-rear direction, and may be provided at positions different in the front-rear direction.

(8) Although the fixing portion 139 to the connector housing 15 in the bracket 22 is fixed to the connector housing 15 by the bolts in the above embodiment, a fixing method of the bracket 22 and the connector housing 15 is not limited to bolt fixing. For example, a fixing portion of a bracket and a connector housing may be provided with a lock protrusion and a lock piece to be engaged with each other, and the fixing portion of the bracket and the connector housing may be fixed by the engagement of these lock protrusion and lock piece.

(9) The shield member 126 for electromagnetically shielding the wires 12 is not essential, and the shielding conductive portion 130 for ground-connecting the shield member 126 is also not essential. Although the fixing portion 139 is provided in the first shielding conductive portion 132 in the above embodiment, a fixing portion is provided in another part of a bracket if the shielding conductive portion 130 is not provided. Even if the shield member 126 is provided, a method for fixing the shield member 126 to the bracket 22 is not limited to the one using the crimp band 128 and may be, for example, welding or adhesion. Note that the shield member 126 may be fixed to a member other than the bracket 22. If the shield member 126 is fixed to the member other than the bracket 22, a shielding conductive portion for ground-connecting the shield member can be appropriately adopted.

(10) Although the first and second shielding conductive portions 132, 134 are fastened together to the connector housing 15 by the fastening bolts 142 in the above embodiment, there is no limitation to this. First and second shielding conductive portions may be separately fixed to the connector housing 15. Further, a shielding conductive portion may be composed of one member or three or more members.

LIST OF REFERENCE NUMERALS 10 connector
12 wire
13 male terminal
14 terminal
15 connector housing
16 connector body
18 tubular portion
20 wire draw-out opening
22 bracket
24 first holding portion
26 second holding portion
28 core wire
30 insulation coating
32 connecting portion
36 upward projecting portion
38 contact point portion
39 insertion hole
40 retainer
42 first retainer
44 second retainer
45 first wall portion
46 engaging wall portion
48 engaging protrusion
50 second wall portion
52 third wall portion
54 fourth wall portion
56 engaging recess
58 engaging protrusion
60 projecting portion
62 harness assembly
63 housing body
64 box-like portion
66 bottom wall
68 peripheral wall
70 bolt insertion hole
72 spacer
74 sealing rubber
76 lid member
78 flat plate portion
80 through hole
82 outer wall portion
84 downward projecting portion
86 rib
88 inner wall portion
90 terminal insertion hole
92 locking hole
94 retainer
96 sealing member
98 retaining member
100 tubular part
102 coupling part
103 fixing bolt
103a head part
104 halved tubular portion
106 contact surface
108 pressure-contact rib
110 upper coupling portion
112 accommodation recess
114 bolt insertion hole
116 halved tubular portion
118 lower coupling portion
120 bolt insertion hole
122 contact surface
124 pressure-contact rib
126 shield member
128 crimp band
130 shielding conductive portion
132 first shielding conductive portion
134 second shielding conductive portion
136 flat plate portion
138 coupling portion
139 fixing portion
140 bolt insertion hole
142 fastening bolt
144 bottom wall
146 side wall
148 bolt insertion hole
149 nut
150 external connecting portion

What is claimed is:

1. A connector, comprising:
a connector housing including a wire draw-out opening;
a terminal accommodated in the connector housing;
a wire connected to the terminal, the wire being pulled out to outside of the connector housing through the wire draw-out opening; and
a bracket made of metal, the bracket holding the wire pulled out through the wire draw-out opening,
the bracket including a first holding portion and a second holding portion to be fixed to each other while sandwiching and holding the wire from both sides in a direction perpendicular to an axis of the wire and a fixing portion to the connector housing.

2. The connector of claim 1, wherein at least one of contact surfaces of the first and second holding portions with the wire is provided with a pressure-contact rib to be pressed into contact with the wire.

3. The connector of claim 2, wherein:
the first and second holding portions include halved tubular portions forming a tubular shape for surrounding the wire by being assembled with each other and inner peripheral surfaces of the halved tubular portions serve as the contact surfaces with the wire, and
a plurality of the pressure-contact ribs are provided apart from each other in an axial direction of the wire on the inner peripheral surfaces of the halved tubular portions of both the first and second holding portions and extend in a circumferential direction of the wire.

4. The connector of claim 2, wherein the pressure-contact rib projects toward an inner peripheral side on the at least one of contact surfaces of the first and second holding portions.

5. The connector of claim 1, wherein each of the first and second holding portions includes a bolt insertion hole, and the first and second holding portions are fixed to each other by a fixing bolt inserted through the respective bolt insertion holes.

6. The connector of claim 5, wherein:
the connector housing includes a plurality of the wire draw-out openings and a plurality of the wires respectively connected to a plurality of the terminals are respectively pulled out through the plurality of wire draw-out openings, and
each of the first and second holding portions has a plurality of the contact surfaces to be brought into contact with the plurality of wires, and the fixing bolt is mounted while being located between the plurality of contact surfaces in an adjacent direction of the plurality of contact surfaces in the first and second holding portions.

7. The connector of claim 1, comprising:
a shield member for covering the wire; and
a first shielding conductive portion to be electrically connected to the shield member, the first shielding conductive portion being provided to cover the connector housing,
the first shielding conductive portion being formed integrally with the bracket, the first shielding conductive portion being provided with the fixing portion.

8. The connector of claim 7, comprising a second shielding conductive portion,
the second shielding conductive portion being fastened to the connector housing together with the fixing portion provided in the first shielding conductive portion by a fastening bolt.

9. The connector of claim 7, wherein the shield member is fixed to the bracket.

10. The connector of claim 9, wherein after a rear end part of the shield member is externally fit to a front part of the bracket, a crimp band made of metal is reduced in diameter and crimped from an outer peripheral side of the shield member such that the shield member is fixed to the bracket.

11. The connector of claim 1, wherein the fixing portion is fixed to the connector housing by a fastening bolt.

* * * * *